(12) United States Patent
Yu et al.

(10) Patent No.: US 10,675,921 B2
(45) Date of Patent: Jun. 9, 2020

(54) TIRE PRESSURE DETECTOR WITH WHEEL BALANCING FUNCTION AND WHEEL BALANCING SYSTEM THEREOF

(71) Applicant: CUB ELECPARTS INC., Changhua County (TW)

(72) Inventors: San-Chuan Yu, Changhua County (TW); Yuan-Tung Hung, Changhua County (TW); Kuo-Ting Lee, Changhua County (TW); Kuan-Kai Huang, Changhua County (TW)

(73) Assignee: CUB ELECPARTS INC., Fuxing Township, Changhua County (TW)

( * ) Notice: Subject to any disclaimer, the term of this patent is extended or adjusted under 35 U.S.C. 154(b) by 133 days.

(21) Appl. No.: 15/903,933

(22) Filed: Feb. 23, 2018

(65) Prior Publication Data

US 2019/0111740 A1 Apr. 18, 2019

(30) Foreign Application Priority Data

Oct. 13, 2017 (TW) .............................. 106135037 A

(51) Int. Cl.
  *B60C 19/00* (2006.01)
  *B60C 23/04* (2006.01)
  *F16F 15/36* (2006.01)
(52) U.S. Cl.
  CPC ............ *B60C 19/003* (2013.01); *B60C 23/04* (2013.01); *B60C 23/0408* (2013.01); *B60C 23/0447* (2013.01); *B60C 23/0493* (2013.01); *F16F 15/363* (2013.01)

(58) Field of Classification Search
CPC combination set(s) only.
See application file for complete search history.

(56) References Cited

U.S. PATENT DOCUMENTS

| 7,107,830 B1* | 9/2006 | Yu ...................... B60C 23/0408 73/146 |
| 7,775,097 B1* | 8/2010 | Huang ................ B60C 23/0496 73/146.3 |
| 2002/0029626 A1* | 3/2002 | Koch ...................... B60C 5/004 73/146.5 |
| 2003/0150261 A1* | 8/2003 | Koch ...................... B60C 5/004 73/146 |

(Continued)

FOREIGN PATENT DOCUMENTS

CN 203948720 U * 11/2014 ......... B60C 23/0494

*Primary Examiner* — Andre J Allen
(74) *Attorney, Agent, or Firm* — Muncy, Geissler, Olds & Lowe, P.C.

(57) ABSTRACT

A tire pressure detector disposed at a wheel, wherein the wheel includes a rim and a tire mounted around the rim, with a pressure space formed between the tire and the rim. The rim includes an air tap connected with the pressure space. The tire pressure detector includes a main body movably disposed in the pressure space and provided with a housing space, and a detection module disposed in the housing space. The detection module further includes a sensing unit for sensing the air pressure in the pressure space and producing a pressure signal. A central processing unit of the detection module receives the pressure signal and wirelessly transmits the pressure signal through the wireless transmission unit. Therefore, vibration and waving issue due to imbalance weight is avoided, thus balancing the wheel.

10 Claims, 7 Drawing Sheets

(56) References Cited

U.S. PATENT DOCUMENTS

2006/0196259 A1* 9/2006 Hsu .................... B60C 23/0408
                                                                 73/146.8
2014/0150542 A1* 6/2014 Townsend ........... B60C 23/0491
                                                                 73/146

* cited by examiner

TIRE PRESSURE DETECTOR WITH WHEEL BALANCING FUNCTION AND WHEEL BALANCING SYSTEM THEREOF

BACKGROUND OF THE INVENTION

1. Field of the Invention

The present invention relates to tire pressure detection, and more particularly, to a tire pressure detector with wheel balancing function and wheel balancing system thereof.

2. Description of the Related Art

A tire detection system is an electronic system disposed at a vehicle wheel for detecting the sufficiency of pressure of the tire, whereby the variation of tire pressure is immediately monitored and displayed through a panel board, a digital displayer, or simple light signals, so as to prevent traffic accidents from occurring due to overpressure of the tire.

The operation method of a tire detection system mainly comprises a direct type and an indirect type detection system. The indirect type tire pressure detection system, instead of directly detecting the tire pressure of a wheel, detects the rotation speed of the wheel. If the system detects the rotation speed of a certain wheel differs from the rotation speed of other wheels in a large degree, the tire pressure of the certain wheel might possibly be abnormal. Therefore, the system informs the driver of the abnormality. However, the indirect tire pressure detection system fails to provide an actual tire pressure value to the driver.

On the other hand, the direct type tire pressure detection system is provided with a detection device capable of transmitting signals, which provides an actual tire pressure value of the wheel to the driver. According to the installation method, the detection devices are further categorized into the internal type and the external type. The external type detection device is disposed at the air tap of the wheel and allowed to be manually installed. However, the detection device possesses a certain weight. When being fastened on the air tap, the detection device causes the mass of the wheel to be unevenly distributed, so as to affect the balance of the wheel. Also, the detection device shall be disassembled during the air filling process of the wheel, thus imposing a risk of damaging the detection device.

Further, when the air tap made of rubber material is combined with the external type detection device, the air tap might waves during the movement of the vehicle. After a long duration, the rubber body of the air tap may possibly be broken. On the other hand, the internal type detection device is disposed in the rim of the wheel. Therefore, the internal type detection device usually has to be installed by a vehicle maintenance work, and the wheel shall be rebalanced after the installation of the internal type detection device.

SUMMARY OF THE INVENTION

For improving the issues above, a tire pressure detector is disclosed. With the main body provided with the detection module disposed in the pressure space, the main body is allowed to move inside the tire during the movement of the vehicle, so as to balance the mass of the wheel, reduce the vibration thereof, and detect the air pressure in the pressure space through the detection module, thus achieving the wheel balancing and tire pressure detection functions.

A tire pressure detector with wheel balancing function in accordance with an embodiment of the present invention is provided, wherein the wheel includes a rim and a tire mounted around the rim, such that a pressure space is produced between the tire and the rim, and the rim is provided with an air tap connected with the pressure space. The tire pressure detector comprises:

a main body movably disposed in the pressure space and provided with a housing space; and a detection module disposed in the housing space, the detection module further comprising a sensing unit, a central processing unit, a wireless transmission unit, and a power unit providing a power; the sensing unit, the central processing unit, the wireless transmission unit, and the power unit are coupled together; the sensing unit senses a pressure in the pressure space and generates a pressure signal; the central processing unit receives the pressure signal; the wireless transmission unit transmits the pressure signal in a manner of wireless transmission.

With such configuration, the main body provided with the detection module is placed in the pressure space, such that the main body moves inside the tire during the movement of the wheel for detecting the pressure in the pressure space. Therefore, the detector does not need to be fixed on the tire, which may cause the unevenness of the wheel mass, and the wheel rebalancing process after the installation is omitted, saving a rather complicated installation procedure. Thus, the installation easiness and convenience of usage are facilitated.

Also, when the main body is able to move inside the tire during the movement of the wheel, a dynamic balance function is carried out to counteract the unbalancing vibration caused by the wheel and the related components, so as to balance the mass of the wheel and reduce the vibration thereof, thereby preventing the issues of wheel mass being affected by the tire pressure detection device and the imbalance and vibration of the wheel. Therefore, the present invention achieves both the wheel balancing and tire pressure detection function.

Further, the tire pressure detector in accordance with the present invention is simply placed in the pressure space between the tire and the rim for balancing the wheel and detecting the tire pressure, without the necessity of being disposed according to the specification of the wheel or the position of the air tap. Therefore, the present invention is applicable to various wheels, enhancing the scope of usage of the present invention.

A wheel balancing system applying the tire pressure detector in accordance with another embodiment of the present invention comprises a plurality of balancing members that are movably disposed in the pressure space together with the tire pressure detector. Therefore, the waving issue of the wheel is reduced to improve the balance of the wheel, such that the driving safety is enhanced.

DETAILED DESCRIPTION OF THE INVENTION

Figure 1:
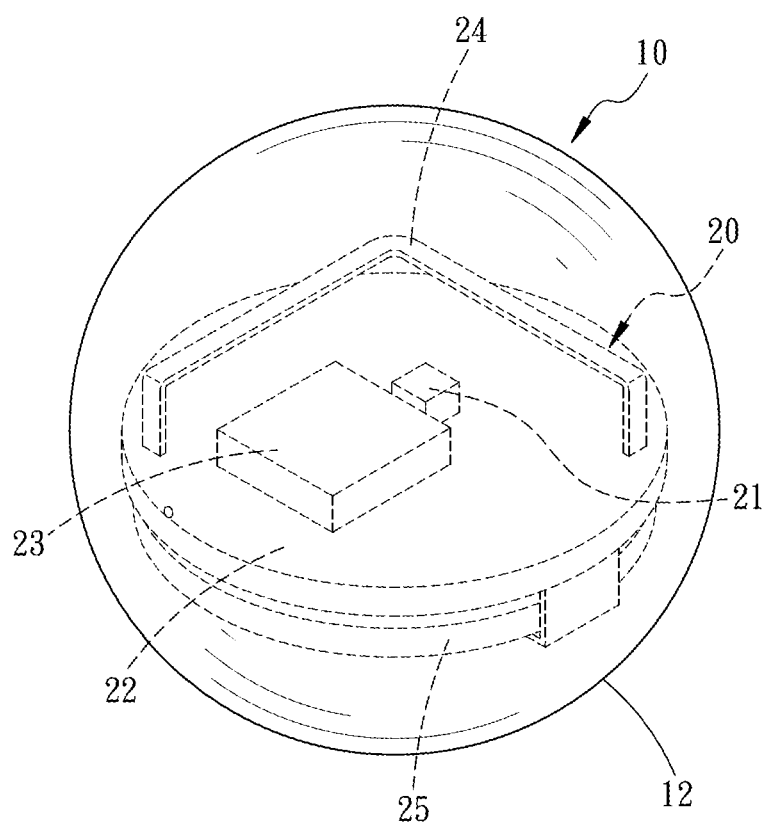
FIG. 1 is a perspective view of a tire pressure detector in accordance with an embodiment of the present invention.

The aforementioned and further advantages and features of the present invention will be understood by reference to the description of the preferred embodiment in conjunction with the accompanying drawings where the components are illustrated based on a proportion for explanation but not subject to the actual component proportion.

The amount of components defined by the texts "a", "an", and "the" used in the singular form includes the embodiments of the plurality forms in the present invention, unless being otherwise defined by the context of the specification. It shall be understood that the texts such as "include" and/or "comprise" indicate that such technical features, bodies, members, modules, and/or units exist among other technical features, bodies, members, modules, and/or units, instead of excluding the existence of others.

When one element/component is mentioned as being "on" or "above", or being "connected", "coupled with", or "combined with" another element/component, it shall be understood that the element/component is disposed on, coupled with, connected with, or combined with the other element/component directly or indirectly with intermediate element/component therebetween.

Referring to FIG. 1 to FIG. 5, a tire pressure detector 100 with wheel balancing function is provided, which is operated at a vehicle wheel, including the wheel of a motorcycle or a car. In an embodiment of the present invention, the vehicle refers to a car. The wheel 1 comprises a rim 2 and a tire 3 mounted around the rim 2. The rim 2 is provided with an outer surface 4 and an outer wall 5. The outer surface 4 faces one end of the rotational axis of the wheel, and the outer wall 5 surrounds the rotational axis of the wheel 1. The tire 3 comprises an outer tire face 6 and an inner tire face 7, wherein the inner tire face 7 of the tire 3 faces the outer wall 5 of the rim 2 and is mounted around the rim 2, with a pressure space 8 formed between the inner tire face 7 of the tire 3 and the outer wall 5 of the rim 2. When the car moves, the outer tire face 6 of the tire 3 contacts the ground. Also, the outer surface 4 of the rim 2 is provided with an air tap 9 which is connected with the pressure space 8, wherein the air tap 9 input air into the pressure space 8.

The tire pressure detector 100 comprises a main body 10 and the detection module 20. The detection module 20 is disposed in a housing space 11 inside the main body 10. The main body 10 is movably disposed in the pressure space 8 for balancing the mass of the wheel 1 and detecting the air pressure in the pressure space 8 through a sensing unit 21 of the detection module 20. Therefore, the present invention achieves both the tire pressure detection and wheel balancing functions.

The main body 10 includes an outer edge 12. The shape of the main body 10 is allowed to be ball-shaped, an oval-shaped, or a polygonal-shaped. In an embodiment of the present invention, the main body 10 is ball-shaped. When the wheel 1 rotates to move the vehicle, the centrifugal force of the wheel 1 causes the outer edge 12 of the main body 10 to roll along the tangent line of the moving wheel 1 and contact the inner tire face 7 of the tire. Therefore, the imbalance vibration caused by the wheel 1 and components thereof are counteracted by use of a dynamic balancing effect. Also, the mass of the wheel 1 is balanced, so as to maintain the balance of the wheel 1. In addition, the main body 10 is allowed to be applied in an amount of one or more. The user is able to adjust the amount of the main body 10 according to different demands or class of the vehicle. In an embodiment of the present invention, a plurality of main bodies 10 are provided.

The detection module 20 is provided with a circuit substrate 22, a sensing unit 21 disposed at the circuit substrate 22, and a central processing unit 23, a wireless transmission unit 24, and a power unit 25 that are coupled with the sensing unit 21, wherein the power unit 25 provides a power. In an embodiment of the present invention, the sensing unit 21, the central processing unit 23, and the wireless transmission unit 24 are integrated. The wireless transmission unit 24 comprises a first antenna portion 241, a second antenna portion 242, and a transition section 243 formed between the first antenna portion 241 and the second antenna portion 242. In an embodiment of the present invention, the transition section 243 is arranged in parallel to the circuit substrate 22 and formed in a shape of a right angle. Further, the wireless transmission unit 24 is allowed to be a Bluetooth structure or radio frequency antenna. The radio frequency antenna is able to be a sub-1 GHz antenna; in other words, the frequency of the radio frequency antenna is lower than 1 GHz, such as 315 MHz, 434 MHz, 868 MHz, or 915 MHz. The power unit 25 is a battery.

Figure 2:
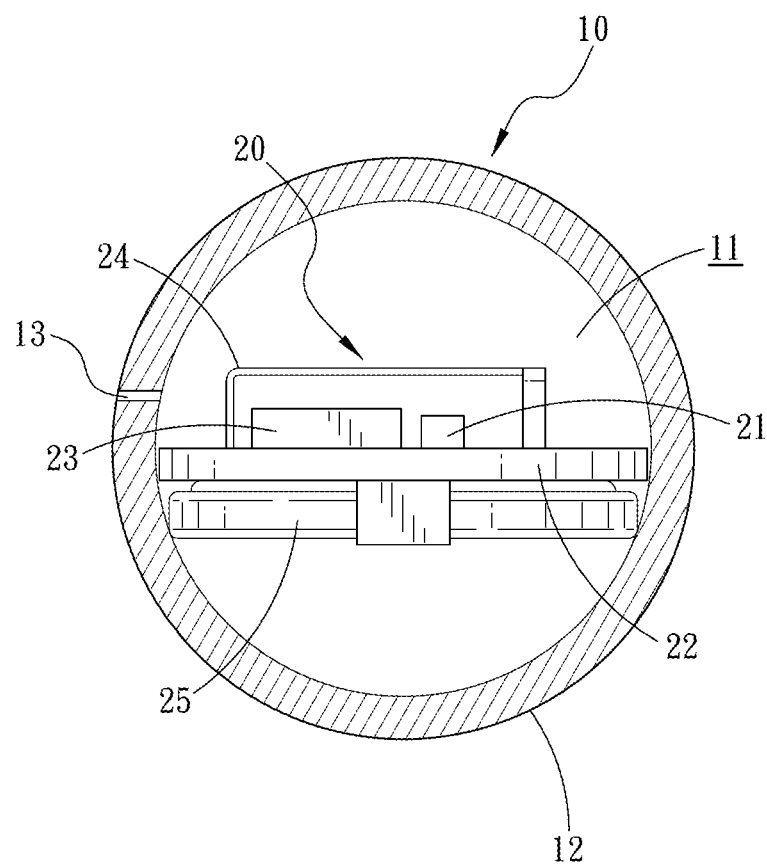
FIG. 2 is a sectional view of the tire pressure detector, illustrating the main body provided with a bore.
Figure 3:
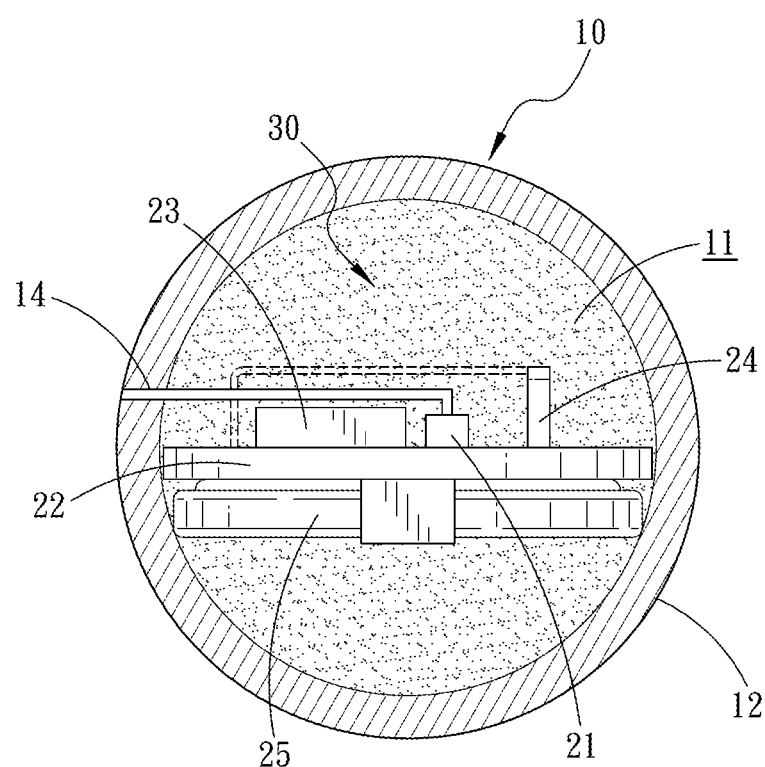
FIG. 3 is another sectional view of the tire pressure detector, illustrating the main body provided with a channel.
Figure 4:
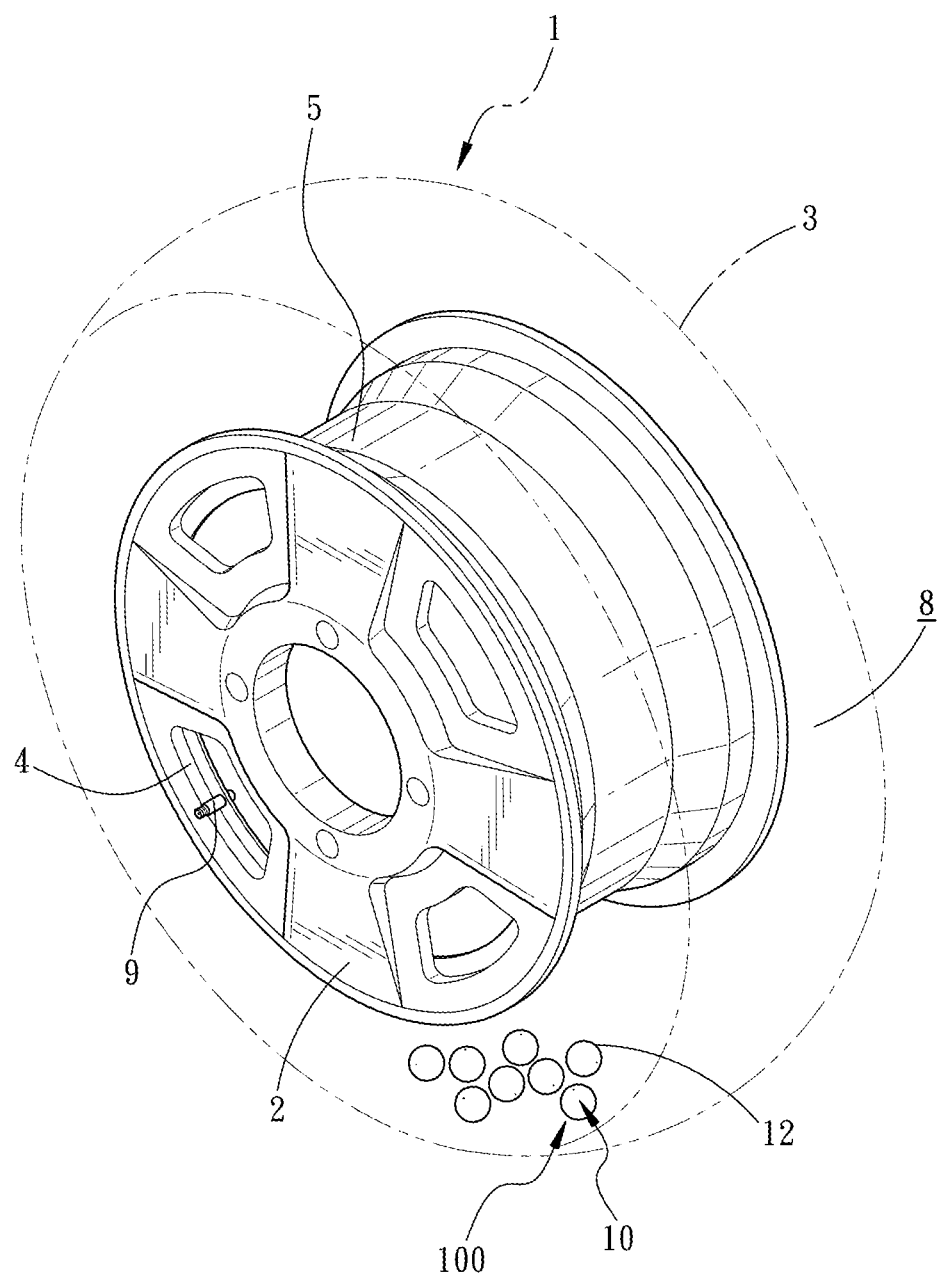
FIG. 4 is a schematic view of an embodiment of the present invention illustrating the tire pressure detector placed in the pressure space of the wheel.
Figure 5:
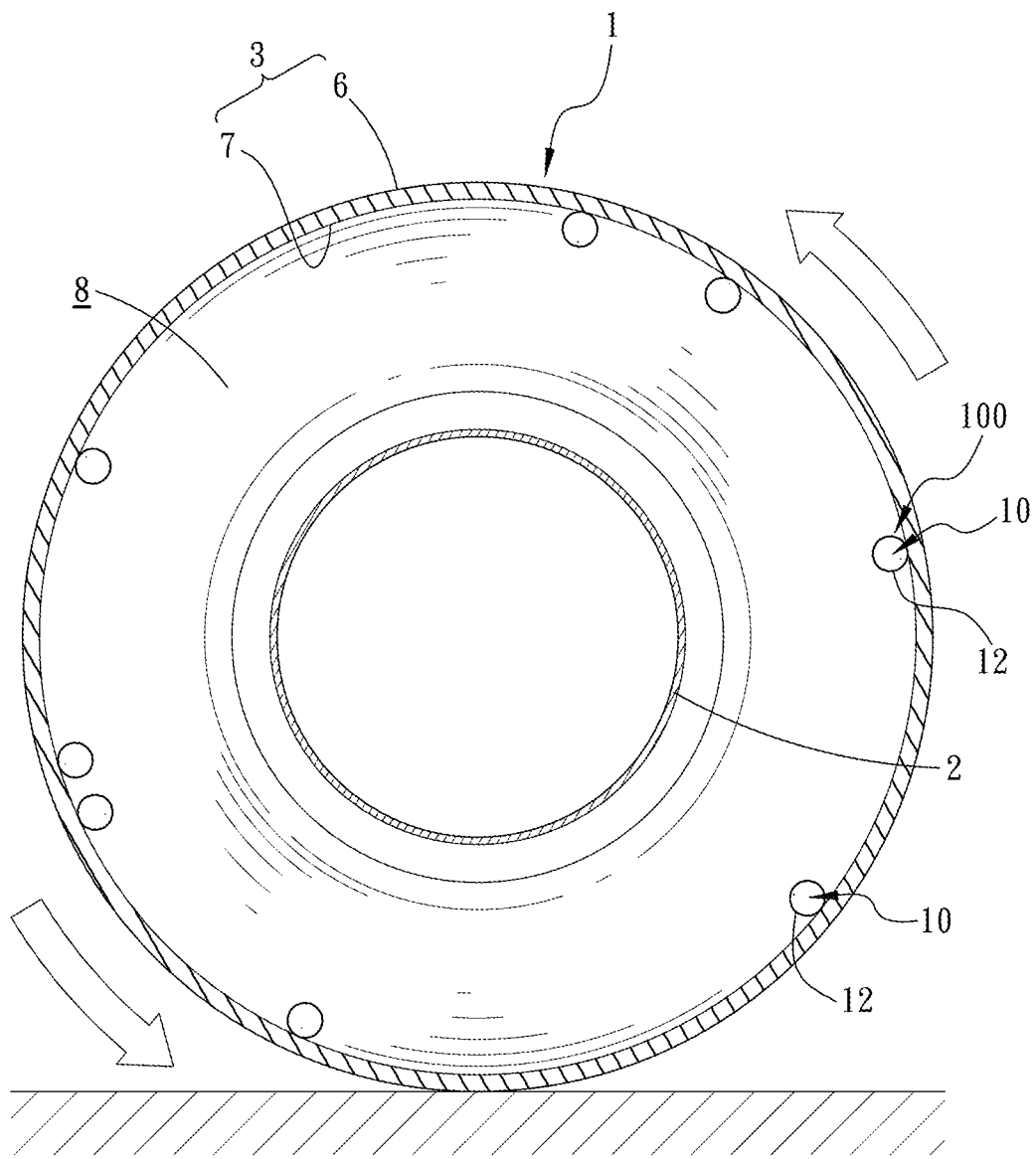
FIG. 5 is a sectional view of an embodiment of the present invention illustrating the main body rolling in the pressure space of the wheel.

Referring to FIG. 2 and FIG. 4, in an embodiment of the present invention, the main body 10 is provided with a bore 13 connected with the housing space 11 and the pressure space 8. The circuit substrate 22 is fixed on an inner surface of the main body 10, so as to fix the detection module 20 to the main body 10. Air in the pressure space 8 enters the housing space 11 through the bore 13. Referring to FIG. 3 and FIG. 4, in another embodiment of the present invention, the main body 10 is provided with a channel 14 which is connected with the pressure space 8 and the sensing unit 21. The detection module 20 is fixed in the housing space 11 of the main body 10 by an adhering member 30, wherein the adhering member 30 fills the housing space 11. The sensing unit 21 detects the air pressure in the pressure space 8 through the channel 14. In the embodiment, the adhering member 30 is a glue.

When the sensing unit 21 detects the air pressure in the pressure space 8, the sensing unit 21 produces a pressure signal, which is sent to the central processing unit 23. The central processing unit 23 receives the pressure signal, and transmits the pressure signal through the wireless transmission unit 24, wherein the wireless transmission unit 24 is wirelessly connected with the electronic control unit (ECU) of the car. Upon receiving the pressure signal, the electronic control unit displays the air pressure of the pressure space 8, or sends out a warning signal when an abnormality of the air pressure in the pressure space 8 occurs, thereby informing the driver. The electrical control unit is an information interface chosen from a panel board, digital displayer, light signals, or sound.

Therefore, by directly placing the main body 10 provided with the detection module 20 in the pressure space 8, the main body 10 is allowed to move in the pressure space 8 of the tire 3 during the movement of the wheel 1, thereby detecting the air pressure in the pressure space 8, thus achieving an installation easiness and a convenience of usage. Also, the issue of a mass imbalance of the wheel 1 is avoided.

Also, the main body 10 rollers to contact the inner tire face 7 of the tire 3 during the movement of the wheel 1, such that the main body 10 is able to counteract the imbalance vibration caused by the wheel 1 and the components thereof in a manner of dynamic balance, thus balancing the mass of the wheel 1 and reducing the vibration of the wheel 1. Therefore, the present invention achieves both the tire pressure detection and the wheel balancing functions.

Figure 6:
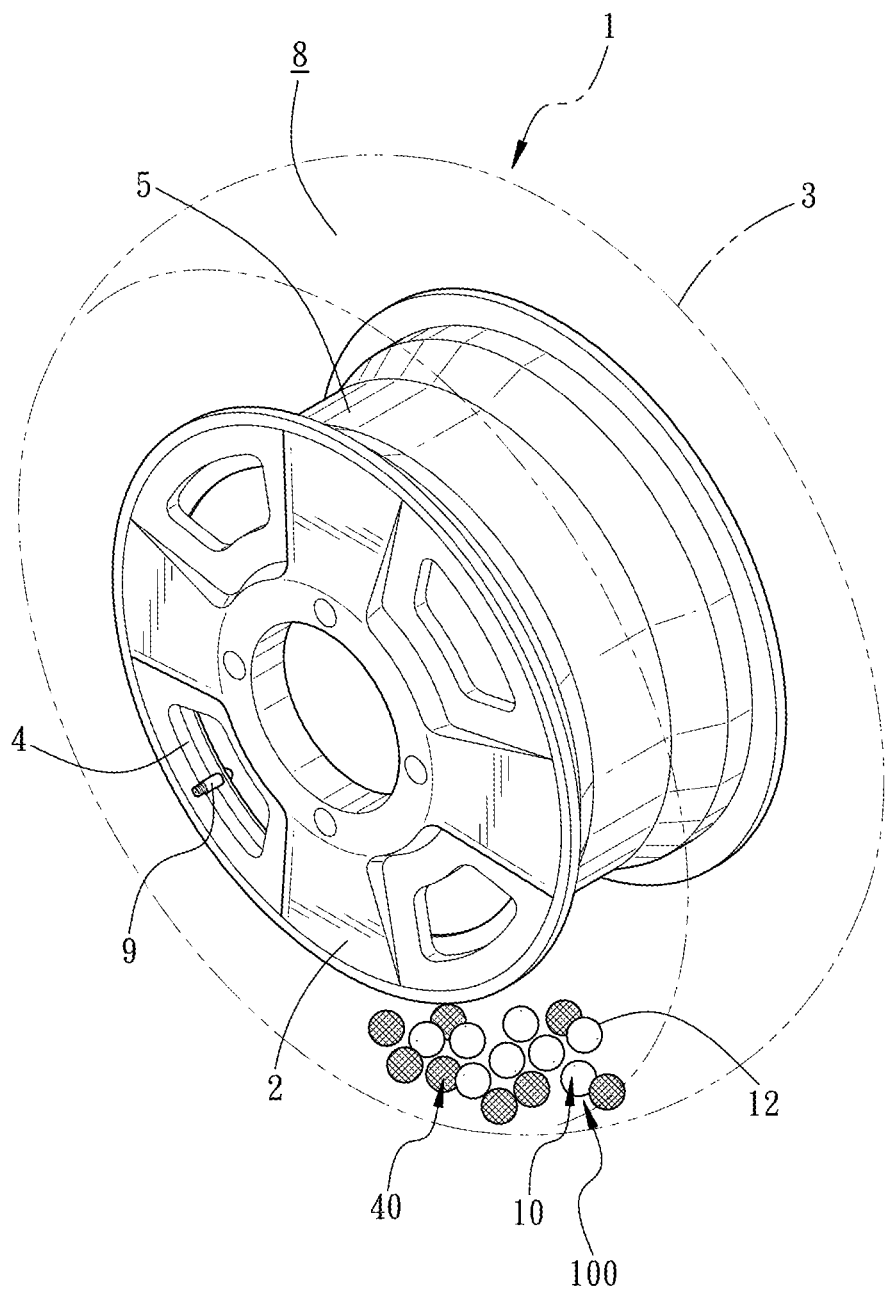
FIG. 6 is a schematic view of another embodiment of the present invention illustrating the balancing member and the tire pressure detector placed in the pressure space.
Figure 7:
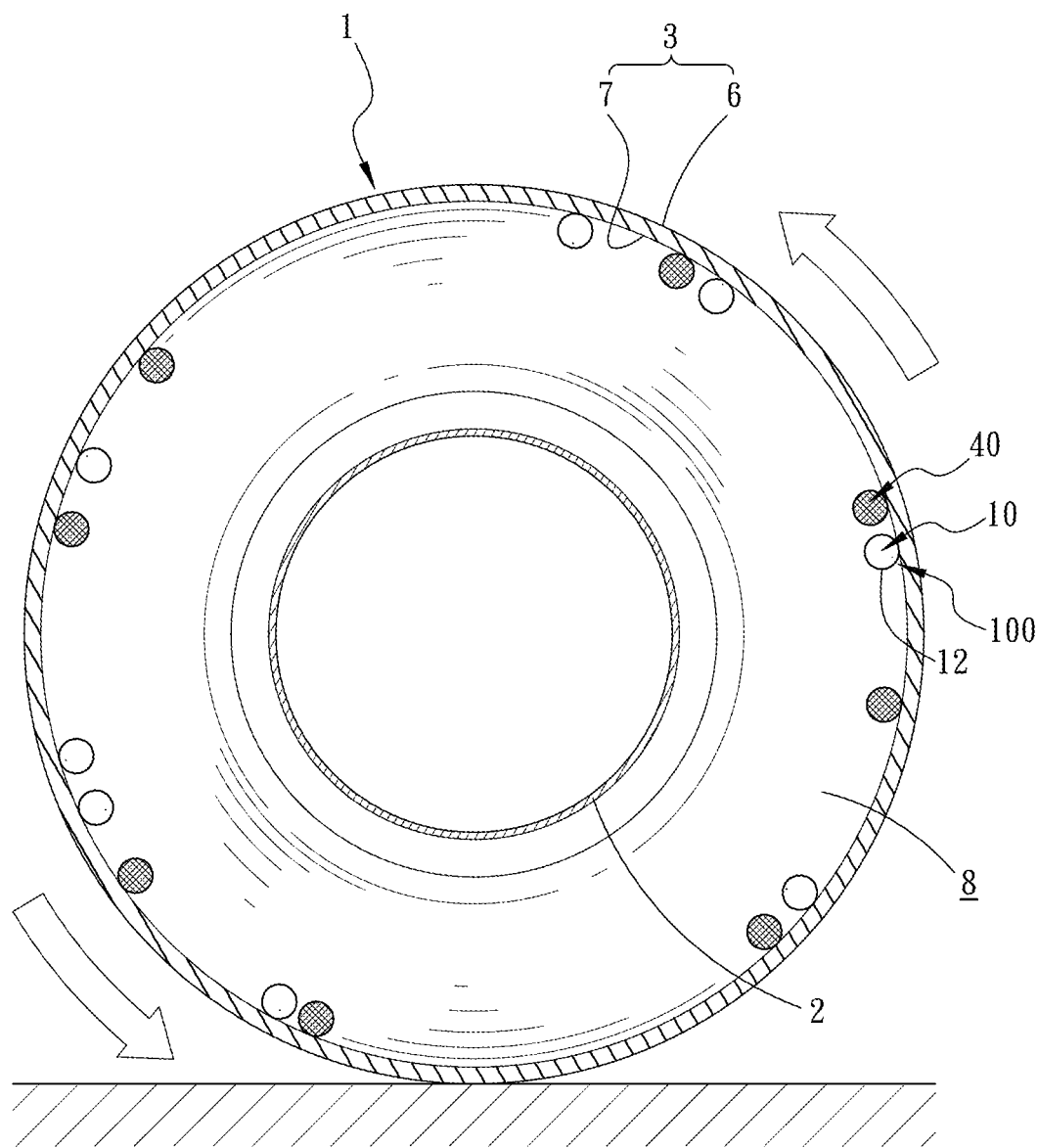
FIG. 7 is a sectional view of another embodiment of the present invention illustrating the balancing member and the tire pressure detector rolling in the pressure space of the wheel.

Referring to FIG. 6 to FIG. 7, in another embodiment of the present invention, a wheel balancing system applying the aforementioned tire pressure detector 100 is provided, which further comprises a plurality of balancing bodies 40.

The balancing bodies 40 are movably disposed in the pressure space 8 along with the tire pressure detectors 100. In an embodiment of the present invention, the shape of the balancing bodies 40 is identical to the shape of the main body 10 of the tire pressure detectors 100. Also, size of the balancing bodies 40 and the main bodies 10 are able to be identical or similar according to different demands. Further, when multiple tire pressure detectors 100 are provided, the amount of the tire pressure detectors 100 is allowed to be larger than, smaller than, or equal to the amount of the balancing bodies 40. The user is able to adjust the amounts of the balancing bodies 40 and the tire pressure detectors 100. In an embodiment of the present invention, the amount of the tire pressure detectors 100 is identical to the amount of the balancing bodies 40.

Thus, when the wheel 1 rotates to drive the car to move, the centrifugal force of the rotation of the wheel 1 causes the balancing bodies 40 and outer edge 12 of the main bodies 10 to contact the inner tire face 7 of the tire 3 along the tangent direction of the moving wheel 1. With the dynamic balance upon the wheel 1 by the balancing bodies 40 and the main bodies 10, the imbalance vibration caused by the wheel 1 and the components thereof are counteracted, thus achieving the balance of the wheel 1.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A tire pressure detector disposed at a wheel, wherein the wheel includes a rim and a tire mounted around the rim, with a pressure space formed between the tire and the rim, the rim including an air tap connected with the pressure space, the tire pressure detector comprising:

a main body movably disposed in the pressure space and provided with a housing space; and a detection module disposed in the housing space, the detection module further including a sensing unit, a circuit substrate, a central processing unit, a wireless transmission unit and a power unit that are coupled with each other; the circuit substrate being fixed on an inner surface of the main body, with the sensing unit, the central processing unit, the wireless transmission unit, and the power unit disposed on the circuit substrate; the wireless transmission unit comprising a first antenna portion, a second antenna portion, and a transition section formed between the first antenna portion and the second antenna portion, and the transition section being arranged in parallel to the circuit substrate; the power unit providing a power, the sensing unit sensing an air pressure in the pressure space and producing a pressure signal, the central processing unit receiving the pressure signal and transmitting the pressure signal through the wireless transmission unit.

2. The tire pressure detector of claim 1, wherein the main body is rotatably disposed in the pressure space.

3. The tire pressure detector of claim 2, wherein the main body includes an outer edge, the outer edge contacting an inner tire face of the tire along a tangent direction of the moving wheel.

4. The tire pressure detector of claim 1, wherein a shape of the main body is chosen from the group consisting of a ball, an oval, and a polygonal shape.

5. The tire pressure detector of claim 4, wherein a plurality of the main bodies are provided.

6. The tire pressure detector of claim 1, wherein the main body is provided with a bore connected with the housing space and the pressure space, such that the sensing unit senses the air pressure in the pressure space.

7. The tire pressure detector of claim 1, wherein the detection module is fixed in the housing space through an adhering member.

8. The tire pressure detector of claim 7, wherein the main body includes a channel connected with the pressure space and the sensing unit.

9. The tire pressure detector of claim 1, further comprising:

a plurality of balancing bodies movably disposed in the pressure space along with the tire pressure detector.

10. The tire pressure detector of claim 9, wherein a shape of the balancing bodies is identical to a shape of the main body of the tire pressure detector.

* * * * *